(12) United States Patent
Kim et al.

(10) Patent No.: US 7,943,251 B2
(45) Date of Patent: May 17, 2011

(54) RECHARGEABLE BATTERY HAVING SAFETY VENT

(75) Inventors: Jong Ku Kim, Yougin-si (KR); Sang Bong Nam, Yougin-si (KR); Youn Han Chang, Yougin-si (KR); Soon Ki Woo, Yougin-si (KR)

(73) Assignee: Samsung SDI Co., Ltd., Suwon (KR)

( * ) Notice: Subject to any disclaimer, the term of this patent is extended or adjusted under 35 U.S.C. 154(b) by 1380 days.

(21) Appl. No.: 11/259,282

(22) Filed: Oct. 27, 2005

(65) Prior Publication Data

US 2006/0115713 A1 Jun. 1, 2006

(30) Foreign Application Priority Data

Oct. 28, 2004 (KR) .................. 10-2004-0086909
Oct. 28, 2004 (KR) .................. 10-2004-0086910

(51) Int. Cl.
*H01M 2/02* (2006.01)
*H01M 2/06* (2006.01)
*H01M 2/12* (2006.01)
*H01M 10/02* (2006.01)

(52) U.S. Cl. .......... 429/99; 429/164; 429/175; 429/176; 429/177; 429/178

(58) Field of Classification Search ...................... None
See application file for complete search history.

(56) References Cited

U.S. PATENT DOCUMENTS

| 6,555,263 B1 * | 4/2003 | Kim et al. ............ 429/61 |
| 6,730,430 B2 * | 5/2004 | Chang .................... 429/53 |
| 2004/0091769 A1 * | 5/2004 | Kawabata et al. ..... 429/163 |

FOREIGN PATENT DOCUMENTS

| JP | 09-102330 | 4/1997 |
| JP | 2001-229913 | 8/2001 |
| KR | 10-0357950 | 8/2001 |

* cited by examiner

*Primary Examiner* — Ula C. Ruddock
*Assistant Examiner* — Alix Echelmeyer
(74) *Attorney, Agent, or Firm* — H.C. Park & Associates, PLC

(57) ABSTRACT

A lithium rechargeable battery includes a current interrupt device in a cap assembly that includes a weakened central breakage portion that is designed to break and interrupt the current in the battery when the pressure inside the battery increases.

39 Claims, 13 Drawing Sheets

RECHARGEABLE BATTERY HAVING SAFETY VENT

CROSS REFERENCE TO RELATED APPLICATION

This application claims priority to and the benefit of Korean Patent Application No. 10-2004-0086910, filed on Oct. 28, 2004 and Korean Patent Application No. 10-2004-0086909, filed on Oct. 28, 2004, which are hereby incorporated by reference for all purposes as if fully set forth herein.

BACKGROUND OF THE INVENTION

1. Field of the Invention

The present invention relates to a lithium rechargeable battery in which a current interrupt device (CID) in the cap assembly is designed to break and interrupt the current in the battery if the battery malfunctions.

2. Discussion of the Background

Lithium rechargeable batteries are classified as either cylinder or square depending on their external shape. The cylinder type battery may include a cap assembly that interrupts the current inside the battery if the battery experiences increased internal pressure due to a malfunction of the battery, such as over charging.

Korean Patent No. 10-0357950 discloses a cap assembly for a cylinder type lithium rechargeable battery that includes a cylindrical can and a cap assembly and insulation gasket that seal the upper end of the can. The can contains an electrolyte and an electrode assembly. The electrode assembly includes a positive electrode plate, a negative electrode plate and a separator interposed between the positive electrode plate and the negative electrode plate. The positive electrode plate, the negative electrode plate and the separator are wound in the form of a jellyroll.

The cap assembly includes a safety vent, a current interrupt device (CID), a secondary protective device and a terminal cap or a cap top. The safety vent has a center portion with a protrusion that extends downward. The safety vent is aligned below the cap assembly, and the protrusion may be deformed upward by pressure generated inside the battery. A positive electrode tap or a negative electrode tap may be welded to a lower portion of the safety vent to electrically connect the positive electrode plate or the negative electrode plate with the safety vent. When either the positive electrode plate or the negative electrode plate is electrically connected with the safety vent, the other electrode plate is electrically connected with a tap or to the cylindrical can.

The CID is installed above the safety vent. Current applied to the safety vent is routed into the secondary protective device. If the internal pressure of the battery increases due to a malfunction, the protrusion of the safety vent bends upward and breaks the CID to interrupt the current.

A conventional CID includes an outer ring and a bar that extends through the center of the outer ring. An insulation printed board with a via hole is positioned on the center of the bar. A conductive layer made from a conductive metal, such as copper, is formed on the inside walls of the via hole. A conductive thin film is formed on the upper and lower surfaces of the insulation printed board. One end of the upper conductive thin film is connected with the outer ring of the insulation printed board, and the other end of the upper conductive thin film is connected with the conductive layer in the via hole. One end of the lower conductive thin film is connected with the outer ring, and the other end of the lower conductive thin film is connected with the conductive layer in the via hole, thereby electrically connecting the upper conductive thin film with the lower conductive thin film through the conductive layer in the via hole.

The bar is provided at both its lateral portions with a breakage part adjacent to the via hole so that the bar can be easily broken.

The CID is aligned so that the safety vent protrusion may pass through and contact the via hole. When the protrusion protrudes upwards, it breaks the bar of the CID about the center of the via hole and breaks the electrical connection between the conductive layer in the via hole and the upper conductive thin film or the lower conductive thin film. Accordingly, the CID interrupts the current between the safety vent and the secondary protective device.

In conventional CIDs, the via hole is formed at the center portion of the cross bar so that the via hole breaks when the internal pressure of the lithium rechargeable battery increases. This requires the conductive layer in the via hole to be completely separated from either the upper conductive thin film or the lower conductive thin film to interrupt the current when the bar is broken by the protrusion of the safety vent. However, the conductive layer may not completely separate from the upper conductive thin film or the lower conductive thin film even if the cross bar is broken because the conductive layer is made from a flexible metal, such as copper. Therefore, even if the bar breaks, the conductive layer in the via hole may maintain electrical contact with the upper conductive thin film and the lower conductive thin film. If the current is not interrupted by the CID, the pressure in the battery may increase and cause an explosion.

SUMMARY OF THE INVENTION

This invention provides a lithium rechargeable battery that includes a cap with a current interrupt device (CID). The CID has a cross bar with an upper thin film conductor electrically connected with a lower thin film conductor through a via hole. A central breakage portion is formed on the cross bar by weakening a center portion of the cross bar so that the cross bar will break and disrupt the current while leaving the via hole intact. Breaking the cross bar interrupts the current inside the battery if the pressure inside the battery increases.

Additional features of the invention will be set forth in the description which follows, and in part will be apparent from the description, or may be learned by practice of the invention.

The present invention discloses a rechargeable battery that includes a cap assembly that includes a safety vent that includes a protrusion that extends downward under normal internal pressure of the rechargeable battery and is deformed upward when the internal pressure of the rechargeable battery increases to a predetermined pressure, and a current interrupt device that is positioned on an upper portion of the safety vent, wherein the current interrupt device includes an outer ring, a cross bar that extends across the center of the outer ring and is connected with the inside edges of the outer ring, wherein the cross bar includes a central breakage part formed by weakening the cross bar at the center of the cross bar over the protrusion of the safety vent, and at least one first via hole positioned between the breakage part and one end of the cross bar, an upper conductive thin film positioned on an upper surface of the outer ring and on a portion of the cross bar that includes at least the continuous area from one end of the cross bar at the outer ring to the first via hole, a lower conductive thin film positioned on a lower surface of the outer ring and on a portion of the cross bar that includes at least the continuous area from one end of the cross bar at the outer ring to the first via hole, and a first conductive layer positioned on the inner wall of the first via hole and electrically connected with the upper conductive thin film and to the lower conductive thin film.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 3b shows a sectional view taken along line A-A shown in FIG. 3a.

FIG. 4b shows a sectional view taken along line B-B shown in FIG. 4a.

FIG. 5b shows a sectional view taken along line C-C shown in FIG. 5a.

FIG. 10b shows a sectional view taken along line D-D shown in FIG. 10a.

FIG. 15b shows a sectional view taken along line E-E shown in FIG. 15a.

DETAILED DESCRIPTION OF THE ILLUSTRATED EMBODIMENTS

Figure 1:
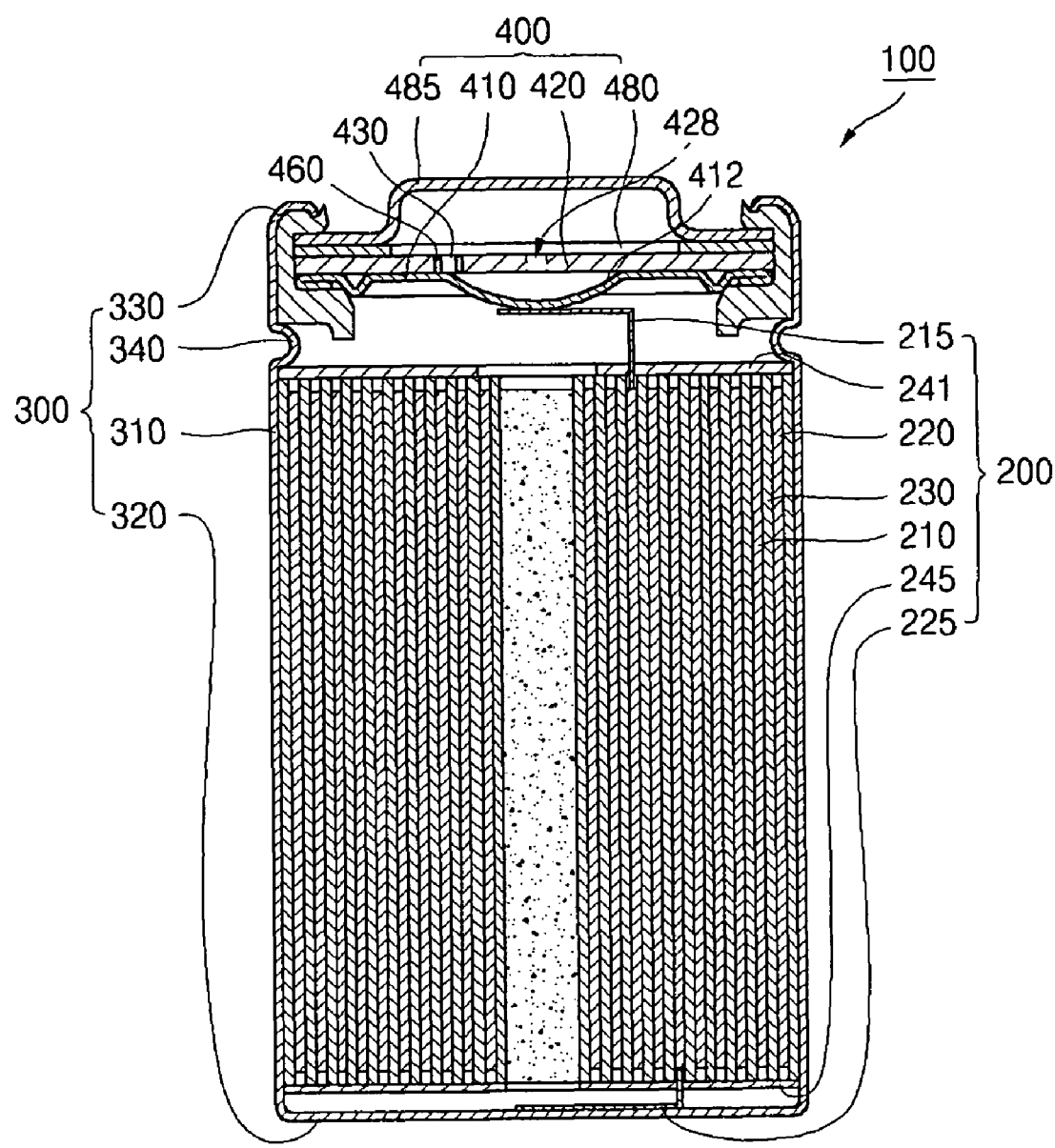
FIG. 1 shows a sectional view of a cylinder type lithium rechargeable battery according to a first exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Also, the same reference numerals are used to designate the same or similar components. Repetition of the description on the same or similar components will be omitted.

It will be understood that when an element such as a layer, film, region or substrate is referred to as being "on" another element, it can be directly on the other element or intervening elements may also be present. In contrast, when an element is referred to as being "directly on" another element, there are no intervening elements present.

Figure 2:
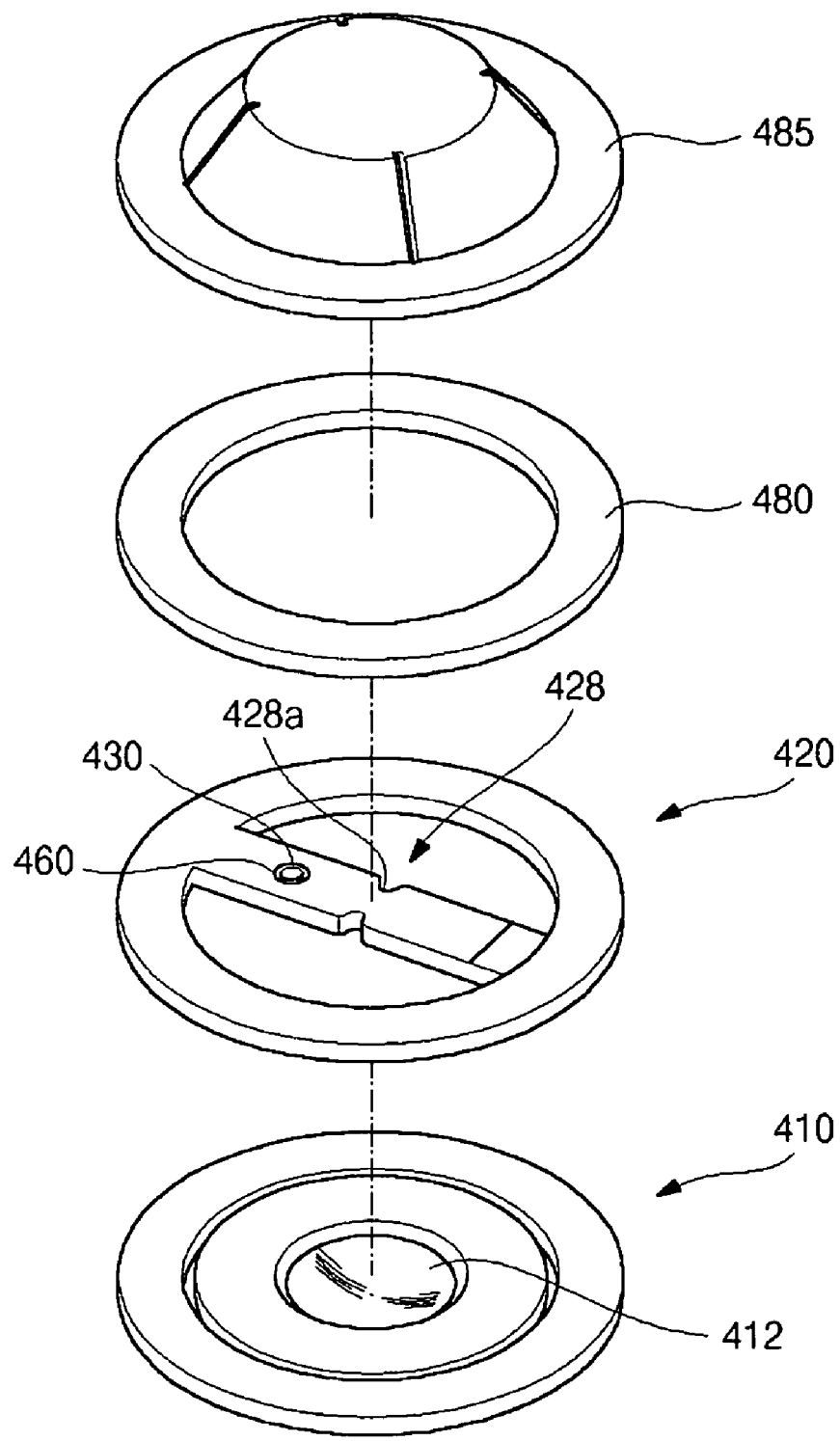
FIG. 2 shows an exploded perspective view of a cap assembly of a cylinder type lithium rechargeable battery according to a first exemplary embodiment of the present invention.
Figure 3A:
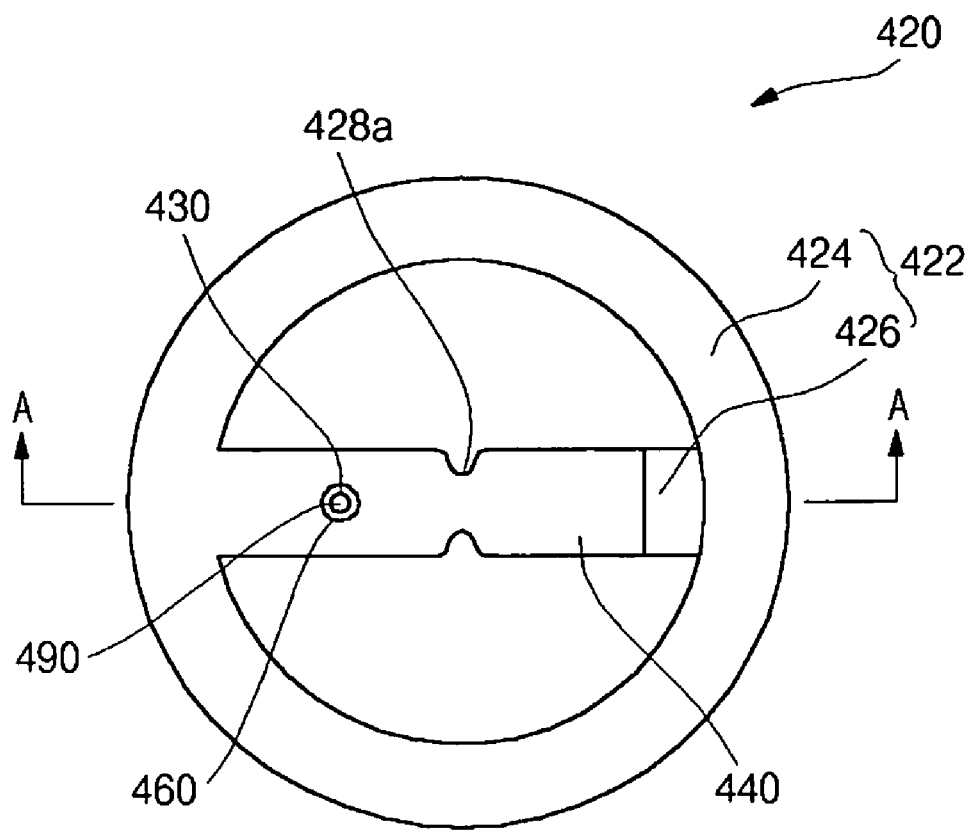
FIG. 3a shows a plan view of a current interrupt device (CID) according to a first exemplary embodiment of the present invention.
Figure 3B:
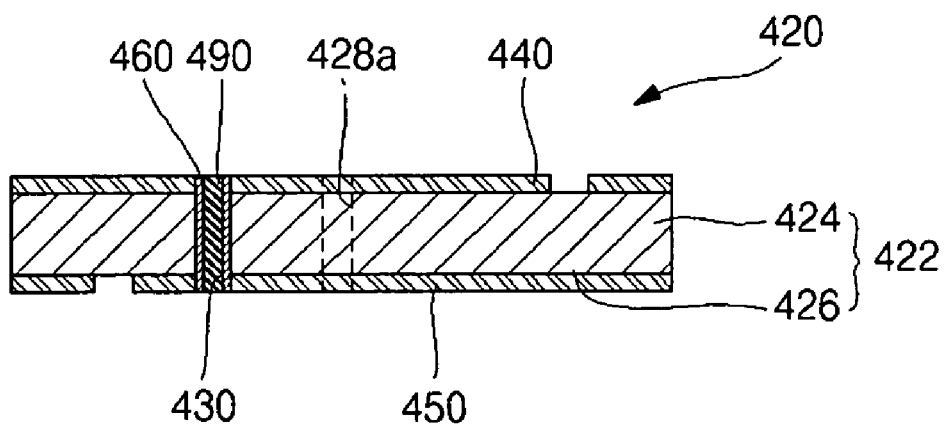

FIG. 1 shows a sectional view of a cylinder type lithium rechargeable battery according to a first embodiment of the present invention. FIG. 2 shows an exploded perspective view of a cap assembly of a cylinder type lithium rechargeable battery according to a first embodiment of the present invention. FIG. 3a shows a plan view of a current interrupt device (CID) according to a first embodiment of the present invention. FIG. 3b shows a sectional view taken along line A-A shown in FIG. 3a.

Referring to FIG. 1, the cylinder type lithium rechargeable battery 100 according to the first exemplary embodiment of the present invention includes an electrode assembly 200 and an electrolyte inside a cylindrical can 300 and a cap assembly 400 that seals the cylindrical can 300 and allows the current generated from the electrode assembly 200 to be fed into an external device.

The electrode assembly 200 includes a positive electrode plate 210 that has a positive electrode collector with a positive electrode coating portion, a negative electrode plate 220 that has a negative electrode collector with a negative electrode coating portion, and a separator 230 interposed between the positive electrode plate 210 and the negative electrode plate 220 in order to insulate the positive electrode plate 210 from the negative electrode plate 220. The positive electrode plate 210, the negative electrode plate 220 and the separator 230 are wound in the form of a jellyroll.

The positive electrode plate 210 includes the positive electrode collector made from a conductive thin metal film, such as aluminum foil. The thin metal film has a positive electrode coating on both surfaces. The positive electrode coating is not applied to either end of the positive electrode plate 210, leaving the ends uncoated. A positive electrode tap 215 protrudes upward out of the electrode assembly 200 and is welded to one end of the positive electrode uncoated portion. The positive electrode tap 215 may be made of aluminum.

The negative electrode plate 220 includes a negative electrode collector, which is coated on both surfaces with a negative electrode coating. The negative electrode collector may be made from a conductive thin metal film, such as copper or nickel foil. The negative electrode coating is not applied to either end of the negative electrode plate 220, leaving the ends uncoated. A negative electrode tap 225 protrudes a predetermined distance downward out of the electrode assembly 200 and is welded to one end of the negative electrode uncoated portion. The negative electrode tap 225 may be made from nickel.

An insulation plate 241 is provided at the upper portion of the electrode assembly 200 and another insulation plate 245 is provided at the lower portion of the electrode assembly 200 to prevent the electrode assembly 200 from contacting the cap assembly 400 and the cylindrical can 300, respectively.

The cylindrical can 300 includes a cylindrical sidewall section 310 with a diameter large enough to accommodate the electrode assembly 200 and a lower plate 320 to seal a lower portion of the cylindrical sidewall section 310. The upper portion of the cylindrical sidewall section 310 is open in order to receive the electrode assembly 200. The negative electrode tap 225 is welded to the center of the lower plate 320 of the cylindrical can 300, which allows the cylindrical can 300 to act as a negative electrode. The cylindrical can 300 may be made from Al, Fe, or alloys thereof. The cylindrical can 300 also includes a clipping part 330 at the upper end portion of the cylindrical can 300 that is bent inward to press an upper portion of the cap assembly 400. The cylindrical can 300 has a beading part 340 formed at a lower portion of the cap assembly 400 that is bent inward to press against the lower portion of the cap assembly 400.

Referring to FIG. 2, the cap assembly 400 includes a safety vent 410, a current interrupt device (CID) 420, a secondary protective device 480, and a cap top 485.

The safety vent 410 is made from a conductive metallic material and has a disc shape with a protrusion 412 that protrudes downward from the center of the safety vent 410. The safety vent 410 is positioned below the cap assembly 400. The safety vent 410 may be made from aluminum or nickel. The positive electrode tap 215 is electrically connected with a lower portion of the safety vent 410, and may be welded to the protrusion 412 of the safety vent 410. The protrusion 412 normally protrudes downward from the safety vent 410. However, if internal pressure of the rechargeable battery increases, the protrusion 412 bends upward.

The secondary protective device 480 has a ring shape with a diameter and a width corresponding to the diameter and width of the safety vent 410. The secondary protective device 480 rests on the upper portion of the CID 420 and is coupled with the CID so that the secondary protective device 480 may interrupt the current when the rechargeable battery temperature significantly increases. The secondary protective device 480 may include a PTC (positive temperature coefficient) element. The PTC element has a resin layer that includes carbon powder. The PTC element has conductive plates coupled with upper and lower surfaces of the resin layer. When the temperature of the PTC element increases, the resin in the resin layer may expand so that the carbon powder is dispersed and the current is interrupted. The PTC element includes a ceramic element. The secondary protective device 480 may be omitted from the cap assembly 400.

The cap top 485 rests on and is coupled with the upper portion of the cap assembly 400. The cap top 485 introduces the current generated from the lithium rechargeable battery to an external device.

Referring to FIG. 3a and FIG. 3b, the CID 420 according to the first exemplary embodiment of the present invention includes a printed insulation board 422, an upper conductive thin film 440, a lower conductive thin film 450 and a first conductive layer 460. The CID 420 is mounted on the upper portion of the safety vent 410. The upper conductive thin film 440 and the lower conductive thin film 450 break when the protrusion 412 of the safety vent 410 bends upward, thereby interrupting the current flowing through the safety vent 410.

The printed insulation board 422 may be made from an insulation material used for a printed circuit board (PCB) and includes an outer ring 424 and a cross bar 426. The outer ring 424 has a width and a diameter that may correspond to the width and diameter of the safety vent 410. The width of the outer ring 424 may correspond to the width of the secondary protective device 480, which has a ring shape and rests on the upper portion of the outer ring 424.

The cross bar 426 is integrally formed with the outer ring. The cross bar 426 crosses the center of the outer ring 424. Both ends of the cross bar 426 are coupled with the inside edges of the outer ring 424. The cross bar 426 includes a central breakage part 428 and at least one first via hole 430 formed between the central breakage part 428 and one end of the cross bar 426. The first via hole 430 may be formed on the left side of the cross bar 426 or on the right side of the cross bar 426 about the central breakage part 428 formed at the center portion of the cross bar 426.

The central breakage part 428 is formed at the center portion of the cross bar 426 that corresponds to the protrusion 412 of the safety vent 410 so that the protrusion 412 may break the center portion of the cross bar 426. When the protrusion 412 of the safety vent 410 is bent upward due to an increase of pressure inside the rechargeable battery, the protrusion 412 of the safety vent 410 may press and break the center portion of the cross bar 426.

Referring to FIG. 3a and FIG. 3b, the central breakage part 428 includes first lateral grooves 428a formed to a predetermined depth on one or both lateral sides of the center portion of the cross bar 426. The depth of the first lateral grooves 428a may be at least about 25% of the width of the cross bar 426. If the depth of the first lateral groove 428a is less than about 25% of the width of the cross bar 426, the center potion of the cross bar 426 may fail to break or may break irregularly when pressure is applied to it.

The cross bar 426 may be required to break under less pressure than is required to deform the safety vent 410. To this end, the width of the cross bar 426 and the depth of the first lateral groove 428a may be such that they cause the pressure required to break the cross bar 426 to be less than the pressure required to deform the safety vent 410.

Referring to FIG. 3b, at least one first via hole 430 is formed between one end of the cross bar 426 and the central breakage part 428. The first via hole 430 may have a diameter that is smaller than the depth of the first lateral groove 428a or the sum of the depths of both first lateral groves 428a, if two first lateral grooves 428a are present. This prevents the cross bar 426 from breaking at the first via hole 430.

The first via hole 430 is formed at an inner portion of the cross bar 426 and has a first conductive layer 460 made from a conductive metal. The conductive metal may be copper or copper alloys. The first conductive layer 460 may be formed using a plating process that is capable of easily adjusting the thickness of the first conductive layer 460 and simplifying the fabrication process for the first conductive layer 460. The first conductive layer 460 may be at least 5 μm thick. If the first conductive layer 460 is less than 5 μm thick, the current flow may be interrupted and electric resistance may increase. The first via hole 430 may be filled with a gap-filling agent 490 made from resin to prevent damage to the first conductive layer 460.

The upper conductive thin film 440 may be made from a conductive metal, such as copper or a copper alloy. The upper conductive thin film 440 is formed on the upper surface of the outer ring 424 and the upper surface of the cross bar 426 including the region of the upper surface of the cross bar 426 around the first via hole 430. The upper conductive thin film 440 is not formed over a predetermined distance at one end of the cross bar 426 to separate the upper conductive thin film 440 at one end of the cross bar 426 from the upper conductive thin film 440 on the outer ring 424. The upper conductive thin film 440 is electrically connected with an upper portion of the first conductive layer 460 formed inside the first via hole 430.

The upper conductive thin film 440 may be formed over the entire area of the upper surface of the outer ring 424 so that the CID 420 can easily make an electrical connection with the secondary protective device 480 or the cap top 485 that rests on the CID 420. Alternatively, the upper conductive thin film 440 may be formed only on a region of the upper surface of the cross bar 426 that includes the area around the first via hole 430 to the part of the upper surface of the outer ring 424 connected with the upper surface of the cross bar 426. However, if the upper conductive thin film 440 is only formed on a part of the upper surface of the outer ring 424, the electric resistance may be increased and the current flow to the secondary protective device 480 or the cap top 485 may be interrupted.

The lower conductive thin film 450 may be made from a conductive metal. The lower conductive thin film 450 is formed on the lower surface of the outer ring 424 and the lower surface of the cross bar 426, including the area around the first via hole 430. The lower conductive thin film 450 is not formed over a predetermined distance at one end of the cross bar 426 to separate the lower conductive thin film 450 at the other end of the cross bar 426 from the lower conductive thin film 450 on the outer ring 424. The end of the cross bar 426 where the lower conductive thin film 450 on the cross bar 426 is separated from the lower conductive thin film 450 on the outer ring 424 may be opposite the end of the cross bar 426 where the upper conductive thin film 440 on the cross bar 426 is separated from the upper conductive thin film 440 on the outer ring 424. The lower conductive thin film 450 is electrically connected with a lower portion of the first conductive layer 460 formed inside the first via hole 430. This allows the current applied to the lower conductive thin film 450 to flow into the upper conductive thin film 440 through the first conductive layer 460.

The lower conductive thin film 450 may be formed over the entire area of the lower surface of the outer ring 424 so that the CID 420 can easily make an electrical connection with the safety vent 410 coupled with the lower surface of the CID 420. Alternatively, the lower conductive thin film 450 may be formed only on a region of the lower surface of the cross bar 426 that includes the area around the first via hole 430 to the part of the lower surface of the outer ring 424 connected with the lower surface of the cross bar 426. However, if the lower conductive thin film 450 is only formed on a part of the lower surface of the outer ring 424, the electric resistance may increase and the current flow to the safety vent 410 may be interrupted.

Figure 4A:
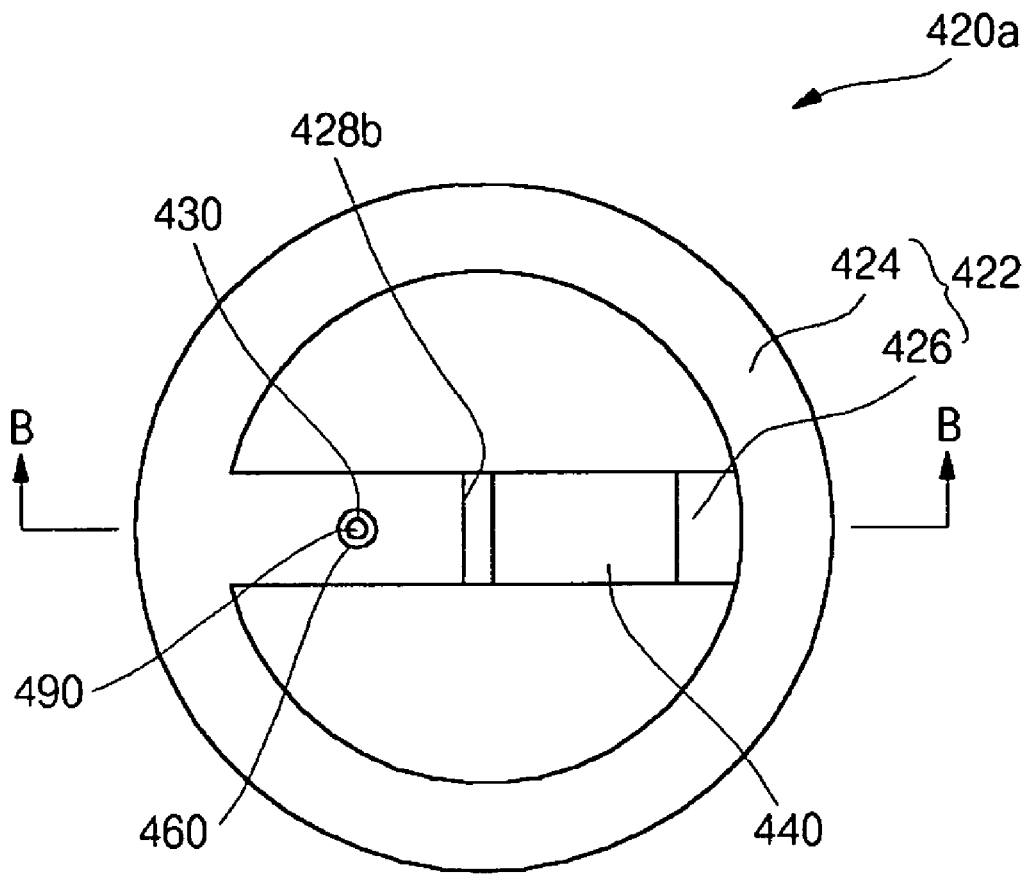
FIG. 4a shows a plan view of a CID according to a second exemplary embodiment of the present invention.
Figure 4B:
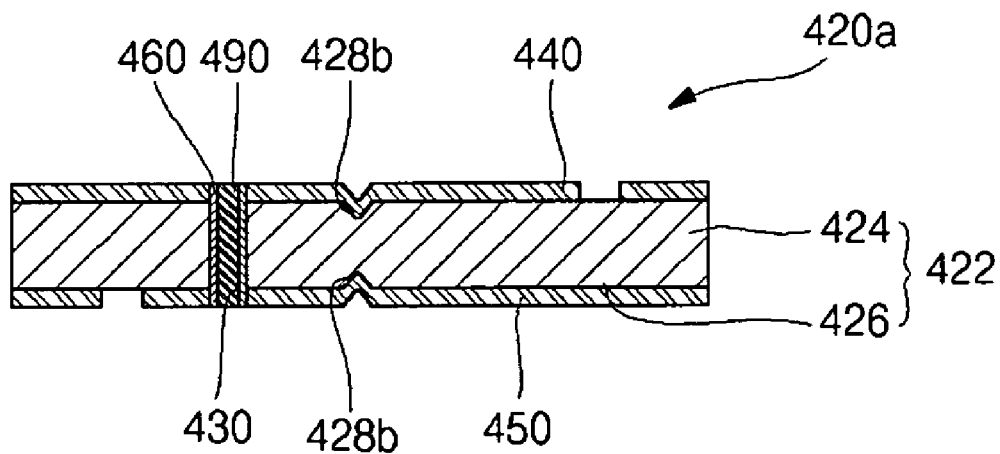

FIG. 4a is a plan view of a CID according to a second exemplary embodiment of the present invention. FIG. 4b is a sectional view taken along line B-B shown in FIG. 4a.

Referring to FIG. 4a and FIG. 4b, the CID 420a according to the second exemplary embodiment of the present invention includes a central breakage part 428 in the form of a central groove 428b that is formed to a predetermined depth. The central groove 428b is formed substantially perpendicular to the cross bar 426 on at least one of the upper and lower surfaces of the cross bar 426.

The central groove 428b is formed substantially perpendicular to the cross bar 426 at the center portion of the upper surface of the cross bar 426 to allow the cross bar 426 to easily break when pressure is applied upwardly to the cross bar 426. The central groove 428b may have a depth of at least about 25% of the thickness of the cross bar 426. If the depth of the central groove 428b is less than about 25% of the thickness of the cross bar 426, the center potion of the cross bar 426 may fail to break or may break irregularly when pressure is applied to it.

The upper conductive thin film 440 formed over the central groove 428b does not act as a current path and may be omitted. However, the lower conductive thin film 450 over the central groove 428b does act as a current path and may be included.

The first via hole 430 may have a diameter that is less than the depth of the central groove 428b or less than the sum of the depths of the central grooves 428b if two central grooves 428b are used.

Figure 5A:
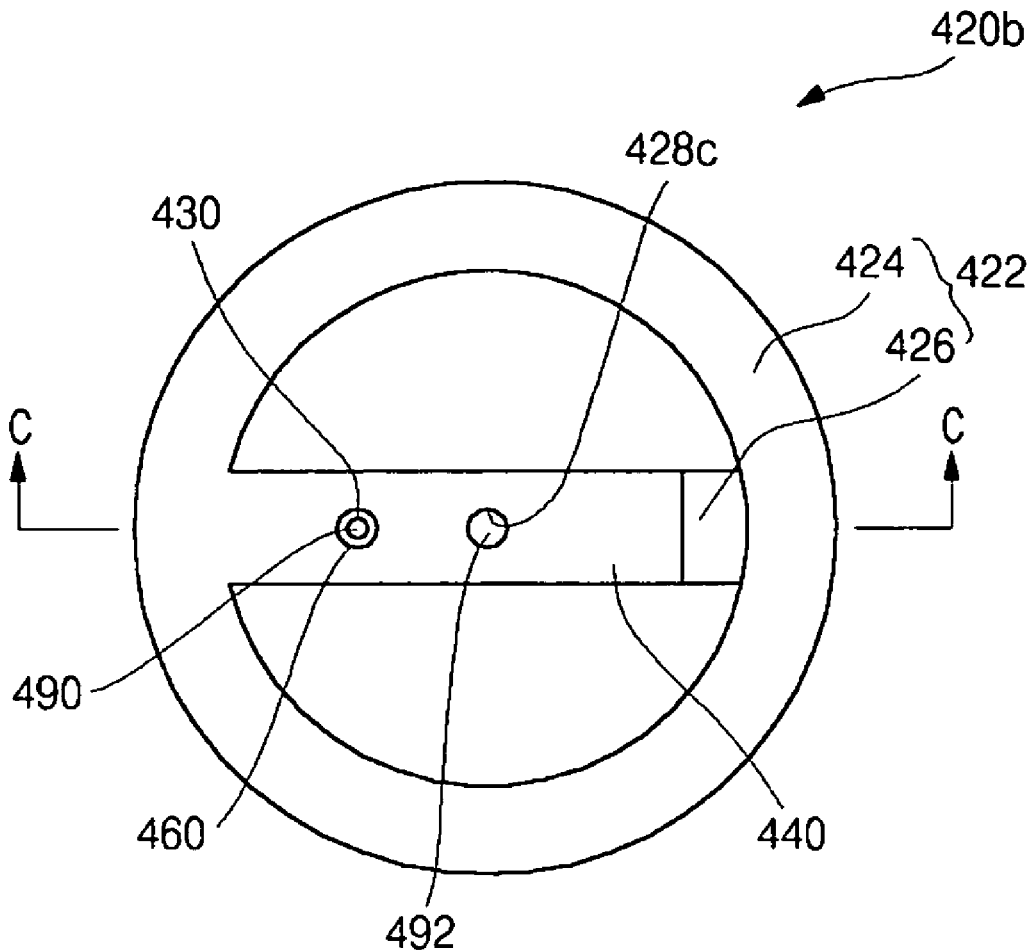
FIG. 5a shows a plan view of a CID according to a third exemplary embodiment of the present invention.
Figure 5B:
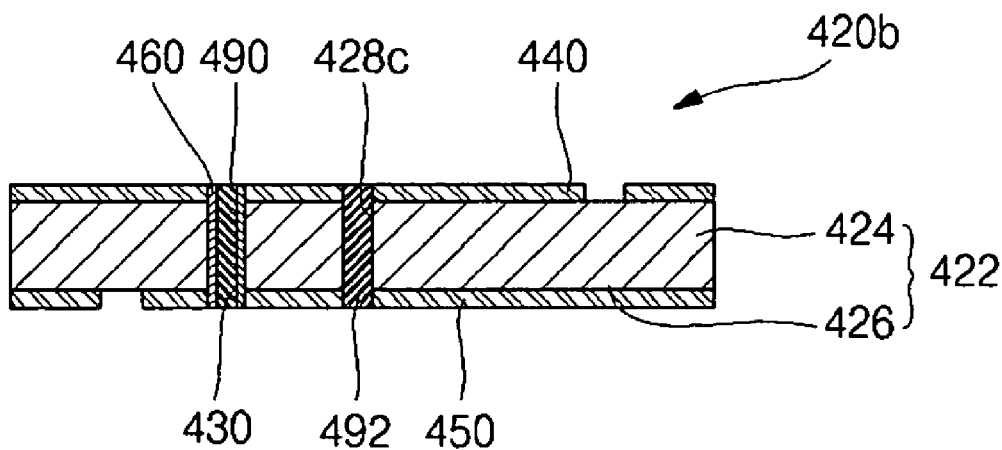

FIG. 5a is a plan view of a CID according to a third exemplary embodiment of the present invention. FIG. 5b is a sectional view taken along line C-C shown in FIG. 5a.

Referring to FIG. 5a and FIG. 5b, the CID 420b according to the third exemplary embodiment of the present invention includes a central breakage part 428 in the form of a central hole 428c, which is positioned at the center portion of the cross bar 426 corresponding to the protrusion 412 of the safety vent 410.

The central hole 428c is formed at the center portion of the cross bar 426 to weaken the center of the cross bar 426 so that it will easily break when pressure is applied. When the protrusion 412 of the safety vent 410 bends upward due to increased pressure inside the rechargeable battery, the protrusion 412 may press and break the center portion of the cross is bar 426. The central hole 428c may have a diameter at least about 25% of the width of the cross bar 426. If the diameter of the central hole 428c is less than about 25% of the width of the cross bar 426, the center potion of the cross bar 426 may fail to break or may break irregularly when pressure is applied to it. The central hole 428c may be filled with a gap-filling agent 492 made from resin so that the inner wall of the central hole 428c is not damaged or weakened.

Figure 6:
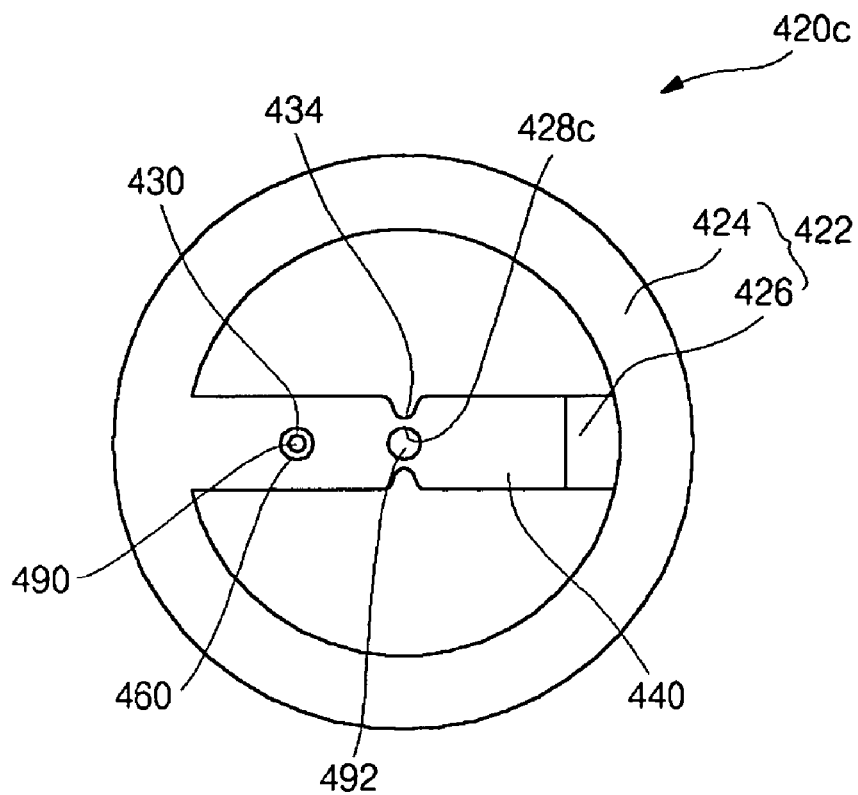
FIG. 6 shows a plan view of a CID according to a fourth exemplary embodiment of the present invention.

FIG. 6 is a plan view of a CID according to a fourth exemplary embodiment of the present invention.

Referring to FIG. 6, the CID 420c according to the fourth exemplary embodiment of the present invention includes a central breakage part 428 that includes a central hole 428c and a first lateral groove 434 formed at one or both lateral sides of the cross bar 426 positioned at the center portion of the cross bar 426 so that they correspond to the protrusion 412 of the safety vent 410.

The first lateral groove 434 may be formed at one or both lateral sides of the cross bar 426 adjacent to the central hole 428c formed at the center portion of the cross bar 426. The first lateral groove 434 cooperates with the central hole 428c to weaken the strength of the center portion of the cross bar 426. The first lateral groove 434 may have a depth of about 50% of the distance between the lateral side of the cross bar 426 and the outer edge of the central hole 428c. If the first lateral groove 434 is too deep, the strength of the cross bar 426 may be so weakened that the cross bar 426 can be broken by external impact. The breakage pressure of the cross bar 426 may be lowered by forming the center hole 428c and the first lateral grooves 434 at the center portion of the cross bar 426.

Figure 7:
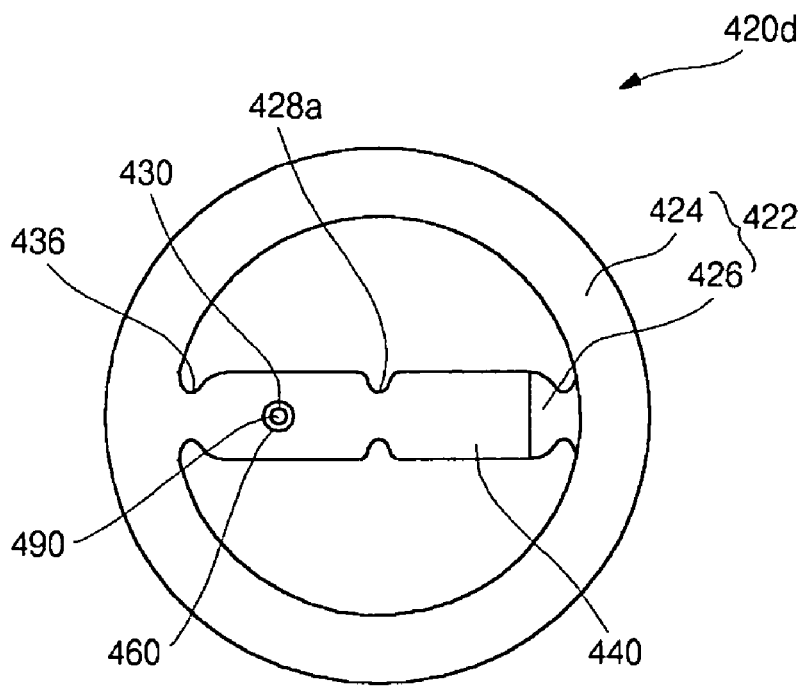
FIG. 7 shows a plan view of a CID according to a fifth exemplary embodiment of the present invention.

FIG. 7 is a plan view of a CID according to a fifth exemplary embodiment of the present invention.

Referring to FIG. 7, the CID 420d according to the fifth exemplary embodiment of the present invention includes a central breakage part 428 that includes first lateral grooves 428a with predetermined depths positioned at both lateral sides of the cross bar 426. Second lateral grooves 436 are formed at one or both lateral sides at both ends portions of the cross bar 426. When the safety vent 410 applies pressure to the lower surface of the cross bar 426, the center portion of the cross bar 426 rises upward and breaks. The second lateral grooves 436 allow the cross bar 426 to bend at the ends and thus raise and break more easily.

If the cross bar 426 is broken at the second lateral grooves 436 instead of the first lateral grooves 428a, the current may not be interrupted. Therefore, the region of the cross bar 426 near the second lateral grooves 436 may be stronger than the region of the cross bar 426 near the first lateral grooves 428a. To achieve this, the cross sectional area of the portion of the cross bar 426 near the second lateral grooves 436 should be larger than the cross sectional area of the portion of the cross bar 426 near the first lateral grooves 428a.

The diameter of the first via hole 430 may be such that the cross sectional area of the cross bar 426 near the first via hole 430 is larger than the cross sectional area of the cross bar 426 near the second lateral grooves 436. The first via hole 430 may have a diameter that is less than the depth of the second lateral groove 436 or the sum of the depths of both second lateral grooves 436, if two second lateral grooves 436 are present. This may prevent the cross bar 426 from being broken at the region corresponding to the first via hole 430.

Figure 8:
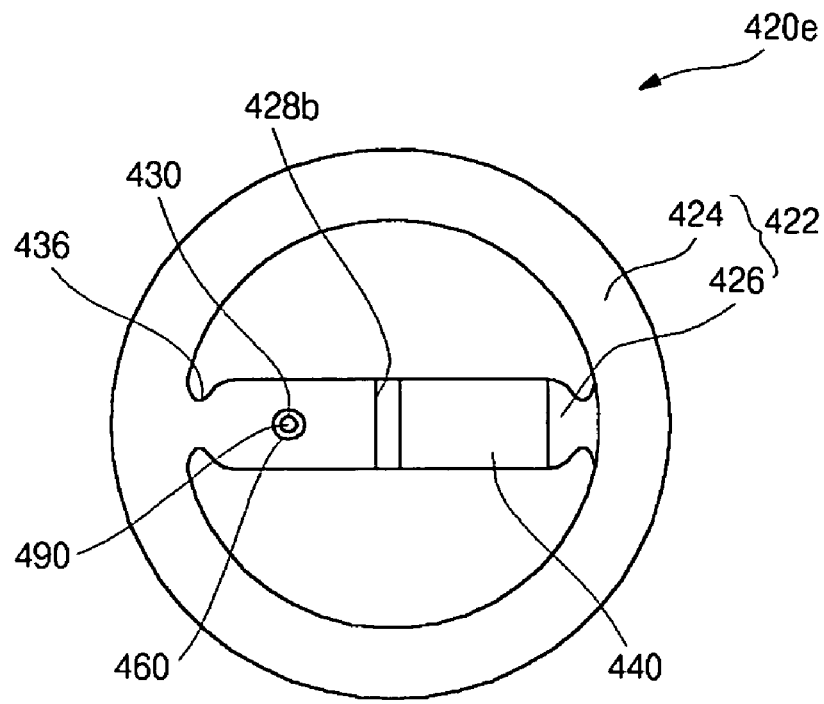
FIG. 8 shows a plan view of a CID according to a sixth exemplary embodiment of the present invention.

FIG. 8 is a plan view of a CID according to a sixth exemplary embodiment of the present invention.

Referring to FIG. 8, the CID 420e according to the sixth exemplary embodiment of the present invention includes a central breakage part 428 in the form of a central groove 428b with a predetermined depth formed substantially perpendicular to the cross bar 426 on at least one of upper and lower surfaces of the cross bar 426. Second lateral grooves 436 are formed at one lateral side or both lateral sides at both end portions of the cross bar 426.

If the cross bar 426 is broken at the second lateral grooves 436 instead of at the central groove 428b, the current may not be interrupted. Therefore, the region of the cross bar 426 near the second lateral grooves 436 may be stronger than the region of the cross bar 426 near the central groove 428b. To achieve this, the cross sectional area of the portion of the cross bar 426 near the second lateral grooves 436 should be larger than the cross sectional area of the portion of the cross bar 426 near the central groove 428b.

Figure 9:
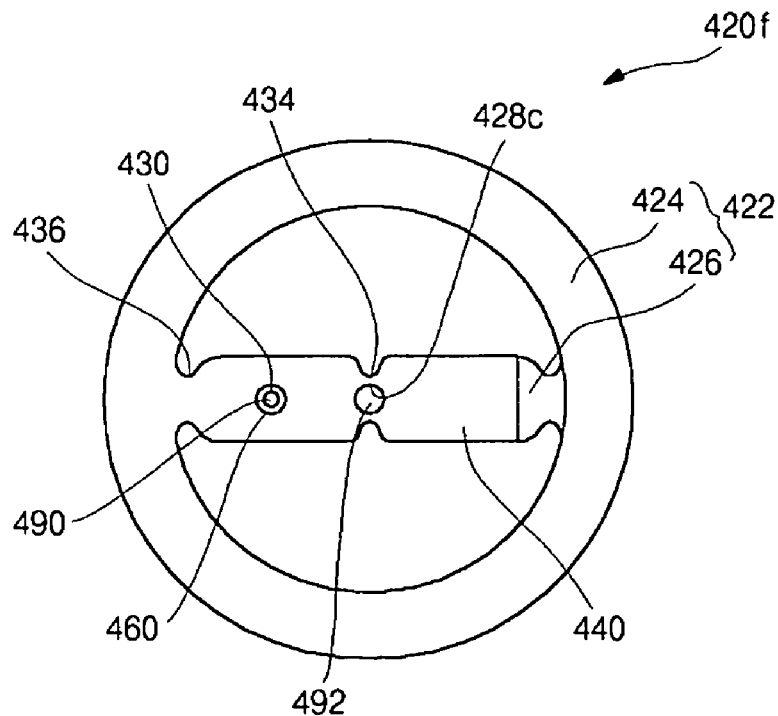
FIG. 9 shows a plan view of a CID according to a seventh exemplary embodiment of the present invention.

FIG. 9 is a plan view of a CID according to a seventh exemplary embodiment of the present invention.

Referring to FIG. 9, the CID 420f according to the seventh exemplary embodiment of the present invention includes a central breakage part 428 that includes a central hole 428c and optionally a first lateral groove 434 formed on one or both lateral sides of the cross bar 426, which are positioned at the center portion of the cross bar 426 to correspond to the protrusion 412 of the safety vent 410. Second lateral grooves 436 are formed at one or both lateral sides at both end portions of the cross bar 426.

If the cross bar 426 is broken at the second lateral grooves 436 instead of at the central hole 428c, the current may not be interrupted. Therefore, the region of the cross bar 426 near the second lateral grooves 436 may be stronger than the region of the cross bar 426 near the central hole 428c. To achieve this, the cross sectional area of the cross bar 426 near the second lateral grooves 436 should be larger than the cross sectional area of the cross bar 426 near the central groove 428b.

The depth of the second lateral groove 436 or the sum of the depth of the second lateral grooves 436, if there are two second lateral grooves 436, may be smaller than the diameter of the central hole 428c (if the central breakage part includes only the central hole 428c) or the sum of the diameter of the central hole 428c and the depth of the second lateral grooves 434 formed at the lateral sides of the center portion of the cross bar 426 (if the central breakage part includes the central hole 428c and the second lateral grooves 434).

Figure 10A:
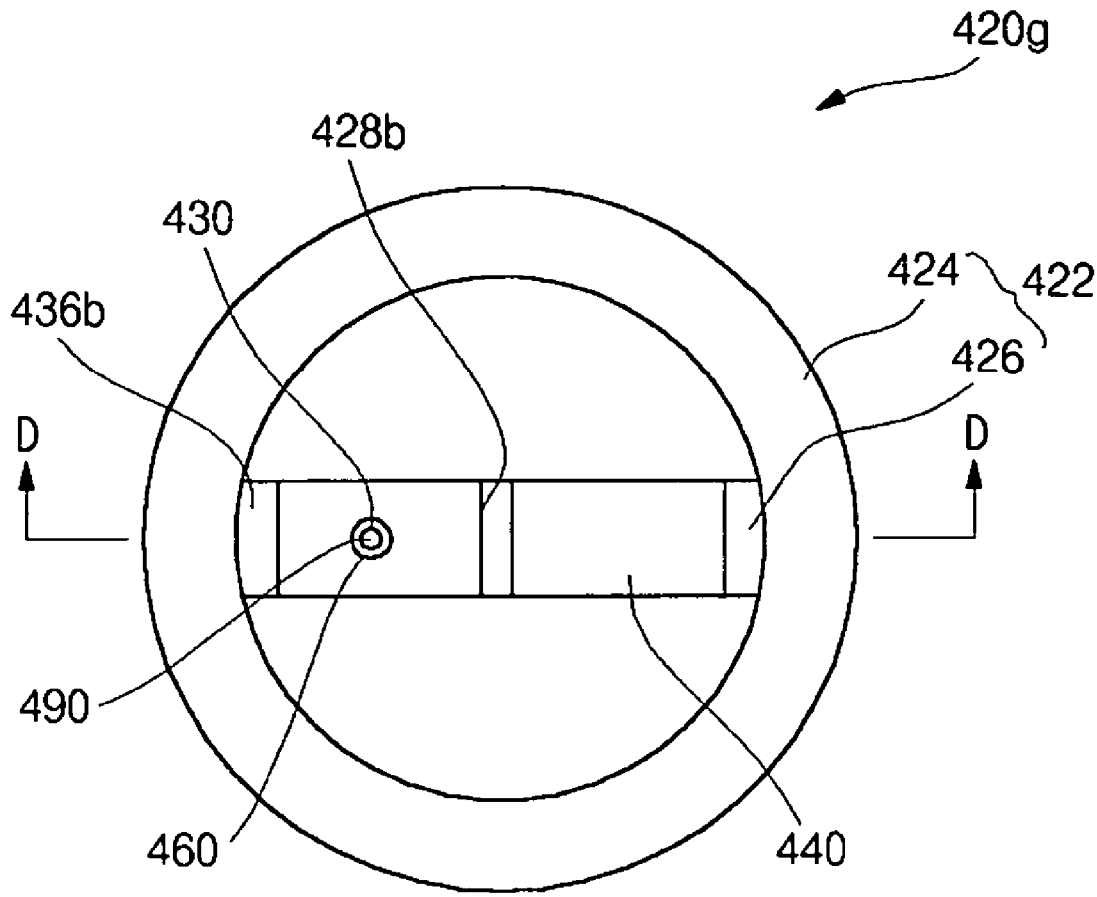
FIG. 10a shows a plan view of a CID according to an eighth exemplary embodiment of the present invention.
Figure 10B:
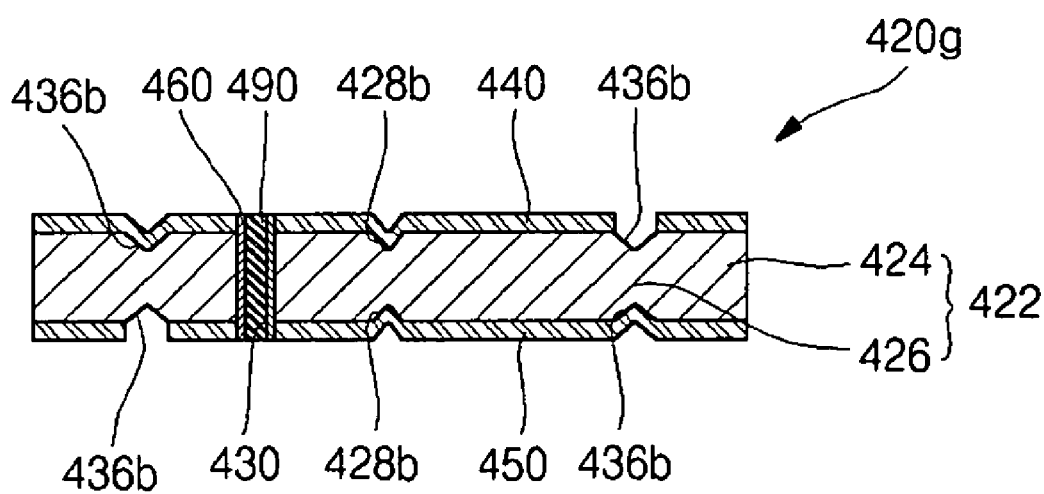

FIG. 10a is a plan view of a CID according to an eighth exemplary embodiment of the present invention. FIG. 10b is a sectional view taken along line D-D shown in FIG. 10a.

Referring to FIG. 10a and FIG. 10b, the CID 420g according to the eighth exemplary embodiment of the present invention includes a central groove 428b formed substantially perpendicular to the cross bar 426 on the center portion of at least one of the upper and lower surfaces of the cross bar 426. End grooves 436b are formed perpendicular to the cross bar 426 on at least one of the upper and lower surfaces at both ends of the cross bar 426. The end grooves 436b allow the cross bar 426 to break easily when pressure is applied upward to the cross bar 426. An upper conductive thin film 440 and a lower conductive thin film 450 are formed over the cross bar 426 and the end grooves 436b on the cross bar 426.

Figure 11:
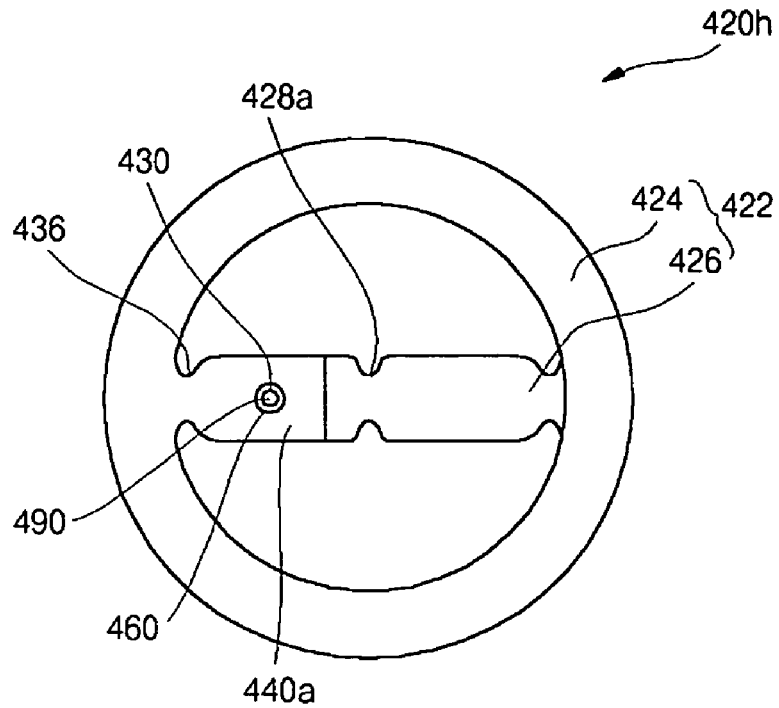
FIG. 11 shows a plan view of a CID according to a ninth exemplary embodiment of the present invention.

FIG. 11 is a plan view of a CID according to a ninth exemplary embodiment of the present invention.

Referring to FIG. 11, the upper conductive thin film 440a ends between the first via hole 430 and a central breakage part 428a of the CID 420h. The upper conductive thin film 440a is electrically connected with the lower conductive thin film 450 by the first conductive layer 460 formed in the first via hole 430. It is not necessary to form the upper conducive thin film 440a over the entire area of the upper surface of the cross bar 426 if the cross bar 426 otherwise has sufficient strength.

Figure 12:
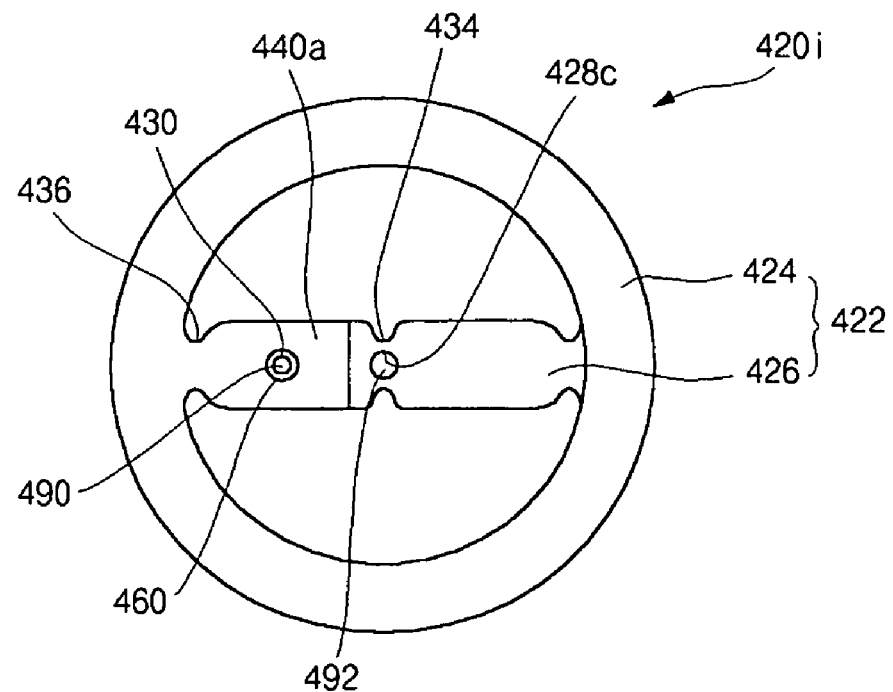
FIG. 12 shows a plan view of a CID according to a tenth exemplary embodiment of the present invention.

FIG. 12 is a plan view of a CID according to a tenth exemplary embodiment of the present invention.

Referring to FIG. 12, a portion of an upper conductive thin film 440a ends between the first via hole 430 and a central hole 428c of the CID 420h. The upper conductive thin film 440a is electrically connected with the lower conductive thin film 450 through the first conductive layer 460 formed in the first via hole 430. It is not necessary to form the upper conducive thin film 440a over the entire area of the upper surface of the cross bar 426 if the cross bar 426 otherwise has sufficient strength.

Figure 13:
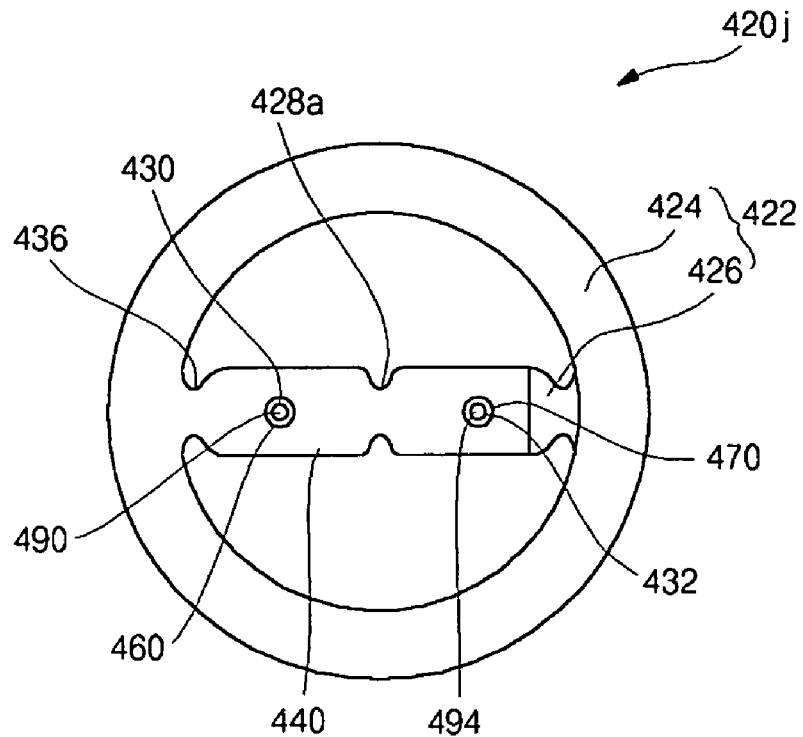
FIG. 13 shows a plan view of a CID according to an eleventh exemplary embodiment of the present invention.

FIG. 13 is a plan view of a CID according to an eleventh exemplary embodiment of the present invention.

Referring to FIG. 13, the CID 420j according to the eleventh exemplary embodiment of the present invention further includes a second via hole 432 formed opposite to the first via hole 430 about the central breakage part 428a. The second via hole 432 may have a shape similar to that of the first via hole 430 and has a second conductive layer 470 formed on the inner wall. The upper conductive thin film 440 covers the region of the cross bar 426 around the second via hole 432. The second conductive layer 470 formed on the inner wall of the second via hole 432 is electrically connected with the upper conductive thin film 440 and the lower conductive thin film 450. The upper conductive film 440 is electrically connected with the lower conductive film 450 through the first conductive layer 460 and the second conductive layer 470, which significantly reduces the electrical resistance. The size of the second via hole 432 may be similar to the size of the first via hole 430 to prevent the cross bar 426 from breaking near the second via hole 432. The second via hole 432 may be filled with a gap-filling agent 494 made from resin to protect the second conductive layer 470 from damage.

Figure 14:
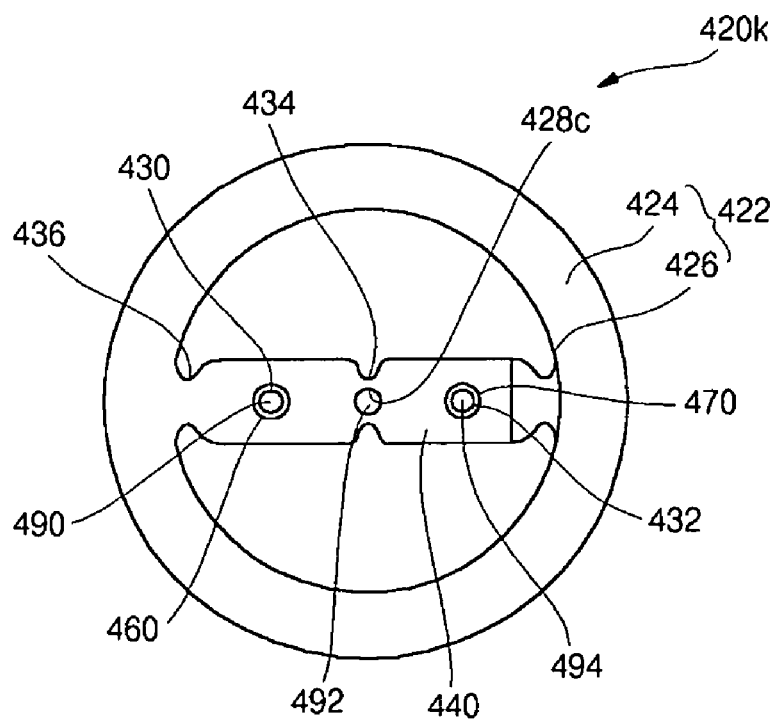
FIG. 14 shows a plan view of a CID according to a twelfth exemplary embodiment of the present invention.

FIG. 14 is a plan view of a CID according to a twelfth exemplary embodiment of the present invention.

Referring to FIG. 14, the CID 420k according to the twelfth exemplary embodiment of the present invention further includes a second via hole 432 formed opposite to the first via hole 430 about the central hole 428c. The second via hole 432 may have a shape similar to that of the first via hole 430 and has a second conductive layer 470 formed on the inner wall. The upper conductive thin film 440 may cover the region of the cross bar 426 around the second via hole 432. The second conductive layer 470 formed on the inner wall of the second via hole 432 is electrically connected with the upper conductive thin film 440 and the lower conductive thin film 450. The upper conductive film 440 is electrically connected with the lower conductive film 450 through the first conductive layer 460 and the second conductive layer 470, which significantly reduces the electrical resistance. The size of the second via hole 432 may be similar to the size of the first via hole 430 to prevent the cross bar 426 from being broken near the second via hole 432. The second via hole 432 may be filled with a gap-filling agent 494 made from resin to protect the second conductive layer 470 from damage.

Figure 15A:
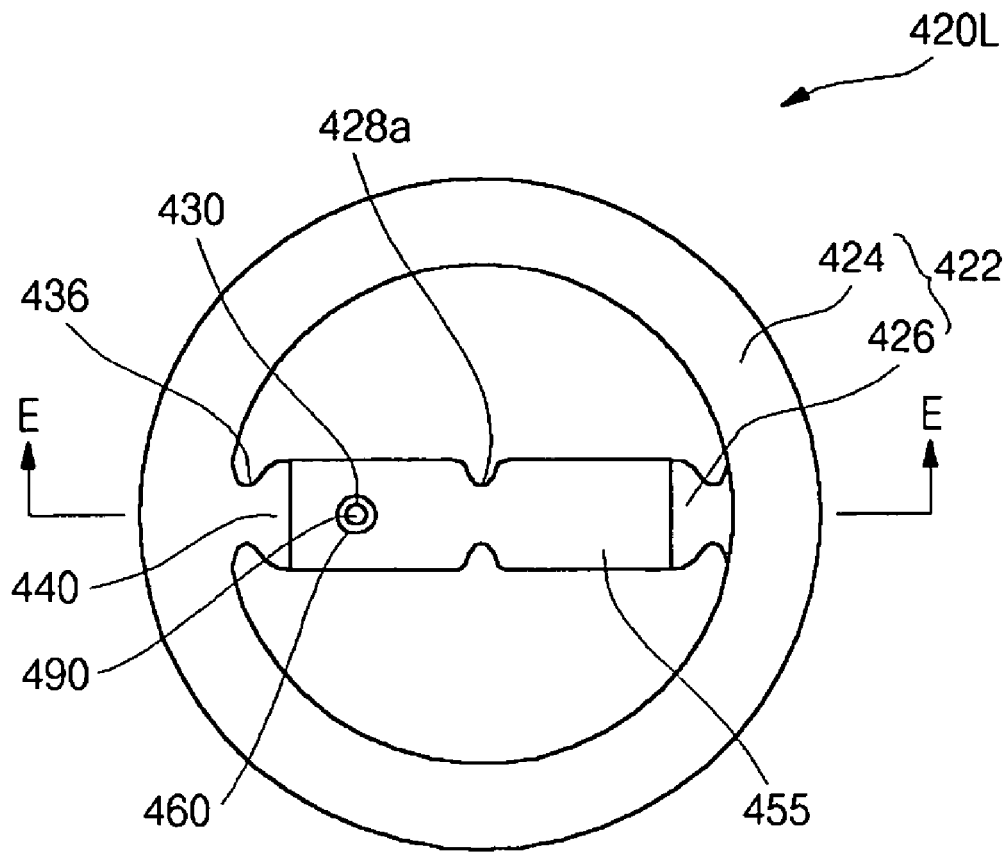
FIG. 15a shows a plan view of a CID according to a thirteenth exemplary embodiment of the present invention.
Figure 15B:
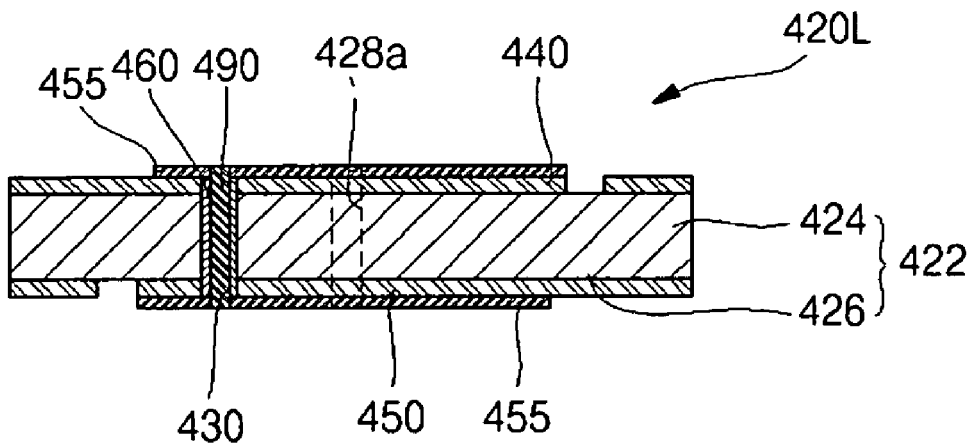

FIG. 15a is a plan view of a CID according to a thirteenth exemplary embodiment of the present invention. FIG. 15b is a sectional view taken along line E-E shown in FIG. 15a.

Referring to FIG. 15, the CID 420L according to the thirteenth exemplary embodiment of the present invention further includes an insulation layer 455 formed on the upper conductive thin film 440 and the lower conductive thin film provided on the upper and lower surfaces of the cross bar 426. The insulation layer 455 may be made from polyimide. The insulation layer 455 prevents current flow between the upper conductive thin film 440 and the secondary protective device 480 or the cap top 485 when the upper conductive thin film 440 would otherwise make contact with the secondary protective device 480 or the cap top 485 due to the breakage of the cross bar 426.

Figure 16:
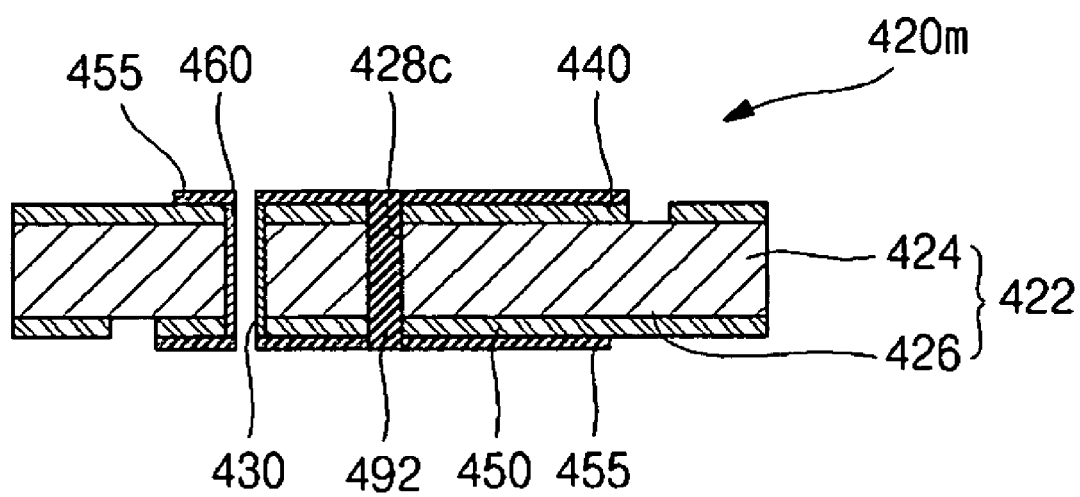
FIG. 16 shows a sectional view of a CID according to a fourteenth exemplary embodiment of the present invention.

FIG. 16 is a sectional view of a CID according to a fourteenth exemplary embodiment of the present invention.

Referring to FIG. 16, the CID 420m according to the fourteenth exemplary embodiment of the present invention further includes an insulation layer 455 formed on the upper conductive thin film 440 and the lower conductive thin film 450 provided on the upper and lower surfaces of the cross bar 426. The insulation layer 455 prevents current flow between the upper conductive thin film 440 and the secondary protective device 480 or the cap top 485 when the upper conductive thin film 440 would otherwise make contact with the secondary protective device 480 or the cap top 485 due to the breakage of the cross bar 426.

Figure 17:
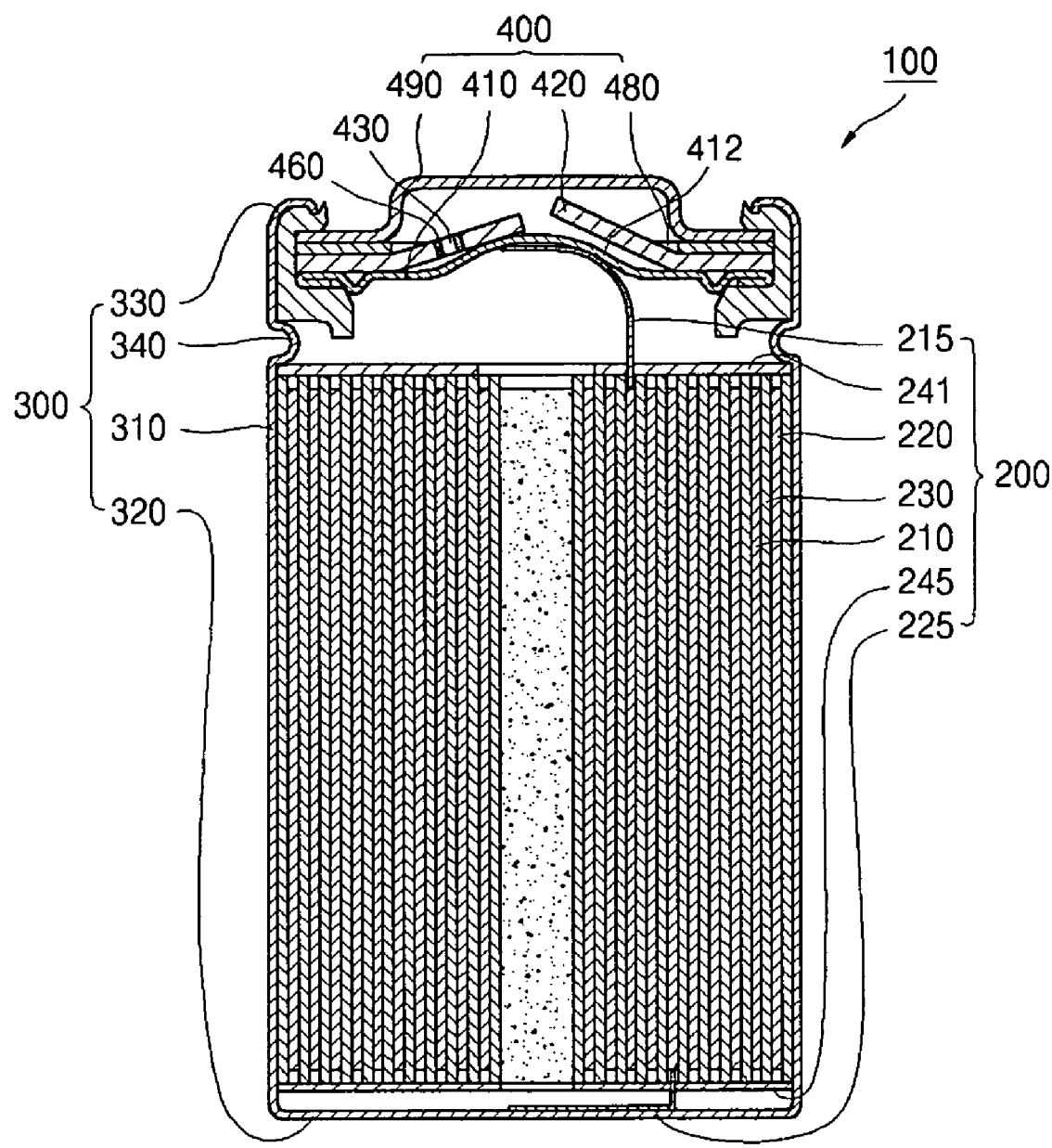
FIG. 17 shows a sectional view of a cylinder type lithium rechargeable battery, in which a CID according to an exemplary embodiment of the present invention has been broken to interrupt the current.

FIG. 17 is a sectional view of a cylinder type lithium rechargeable battery that illustrates the operation of the CID according to the present invention.

Referring to FIG. 17, the cylinder type lithium rechargeable battery includes an electrode assembly 200 accommodated in the cylindrical can 300. The cap assembly 400 is coupled to the opening at the upper end of the cylindrical can 300, thereby sealing the cylindrical can 300. The cap assembly 400 has a stacked structure that includes the safety vent 410, the CID 420, the secondary protective device 480 and the cap top 485. The cap assembly 400 and a gasket are press-fitted to the upper portion of the cylindrical can 300.

Normally, the current generated from the electrode assembly 200 flows into the safety vent 410 through the electrode tap 215, through the safety vent 410, through the lower conductive thin film 450, through the first via hole 430, through the upper conductive thin film 440 of the CID 420, through the secondary protective element 480 and into the cap top 485. The cap top 485 introduces the current to the outside.

If the cylinder type lithium rechargeable battery enters an abnormal state, such as over charging or over discharging of the cylinder type lithium rechargeable battery, the internal pressure of the battery will increase. This causes the protrusion 412 of the safety vent 410 to bend upward and press the cross bar 426 of the CID 420. When enough pressure is applied to the cross bar 426, the central breakage part 428 formed at the center portion of the cross bar 426 will break. Accordingly, the upper conductive thin film 440 and the lower conductive thin film 450 are also broken.

The first via hole 430 and the first conductive layer 460 may not be damaged when the cross bar 426 is broken. The upper conductive thin film 440 may maintain electrical contact with the lower conductive thin film 450 through the first conductive layer 460. However, the current may not reach the first conductive layer 460 because the upper conductive thin film 440 and the lower conductive thin film 450 may have been broken about the central breakage part 428. The CID 420 will thus interrupt the current even though the first via hole 430 may not break.

Thus, current may not be applied to the cap assembly 400 during a malfunction of the lithium rechargeable battery so that the battery may not react with the current, thereby ensuring the stability of the lithium rechargeable battery.

Breaking the cross bar 426 may stop the current inside the battery even when the cross bar includes a first via hole 430 and a second via hole 432 formed at right and left sides of the cross bar 426 about the central breakage part 428.

The present invention is applicable to cylinder type lithium rechargeable batteries and other types of lithium rechargeable batteries. The present invention is also applicable to batteries other than lithium rechargeable batteries.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A rechargeable battery, comprising:
a cap assembly comprising,
a safety vent that comprises a protrusion that bends in response to an increase in the internal pressure of the battery, and
a current interrupt device arranged on an upper portion of the safety vent,
wherein the current interrupt device comprises,
an outer ring,
an upper conductive thin film arranged on an upper surface of the outer ring,
a lower conductive thin film arranged on a lower surface of the outer ring,
a cross bar that extends across a center portion of the outer ring and is coupled with inside edges of the outer ring,
wherein the cross bar comprises,
a central breakage part formed by weakening the cross bar at a center portion of the cross bar,
at least one first via hole arranged between the central breakage part and an end of the cross bar,
the upper conductive thin film arranged on an upper portion of the cross bar, the upper portion of the cross bar comprising at least an area from an end of the cross bar at the outer ring to the first via hole,
the lower conductive thin film arranged on a lower portion of the cross bar, the lower portion of the cross bar comprising at least an area from an end of the cross bar at the outer ring to the first via hole,
an upper uncovered portion where the upper conductive thin film is not formed on an upper portion of the cross bar between the first via hole and one end of the crossbar at the outer ring,
a lower uncovered portion where the lower conductive thin film is not formed on a lower portion of the cross bar between the first via hole and the other end of the crossbar at the outer ring, and
a first conductive layer arranged on an inner wall of the first via hole and electrically connected with the upper conductive thin film and the lower conductive thin film.

2. The rechargeable battery of claim 1,
wherein the protrusion of the safety vent is arranged at a center portion of the safety vent.

3. The rechargeable battery of claim 1,
wherein an outside diameter of the outer ring is substantially the same size as an outside diameter of the safety vent.

4. The rechargeable battery of claim 1,
wherein the upper conductive thin film is formed on the entire upper surface of the outer ring and on a portion of the upper surface of the cross bar that comprises an area from an end of the cross bar at the outer ring to past the first via hole, and
wherein the upper conductive thin film is not formed on the portion of the cross bar that comprises an area from the other end of the cross bar at the outer ring to before the first via hole.

5. The rechargeable battery of claim 4,
wherein the upper conductive thin film is not formed on the portion of the cross bar that comprises an area between the other end of the cross bar at the outer ring to past the center of the cross bar, but before the first via hole.

6. The rechargeable battery of claim 1,
wherein the lower conductive thin film is formed on the entire lower surface of the outer ring and on the portion of the lower surface of the cross bar that comprises an area from an end of the cross bar at the outer ring to past the first via hole, and
wherein the lower conductive thin film is not formed on the portion of the cross bar that comprises an area from the other end of the cross bar at the outer ring to before the first via hole.

7. The rechargeable battery of claim 1,
wherein a pressure required to break the cross bar is less than a pressure required to deform the protrusion of the safety vent.

8. The rechargeable battery of claim 1,
wherein the central breakage part comprises at least one lateral groove formed on at least one lateral side of the cross bar.

9. The rechargeable battery of claim 8,
wherein a depth of the lateral groove is at least about 25% of the width of the cross bar.

10. The rechargeable battery of claim 8,
wherein a cross sectional area of the first via hole is less than the cross sectional area of the lateral grooves.

11. The rechargeable battery of claim 1,
wherein the central breakage part comprises a central hole formed at a center portion of the cross bar.

12. The rechargeable battery of claim 11,
wherein the central hole has a diameter that is at least 25% of a width of the cross bar.

13. The rechargeable battery of claim 11,
wherein the first via hole has a diameter that is smaller than a diameter of the central hole.

14. The rechargeable battery of claim 11,
wherein the central breakage part further comprises at least one lateral groove formed on at least one lateral side of the cross bar and positioned next to the central hole.

15. The rechargeable battery of claim 14,
wherein the lateral groove has a depth equal to or less than 50% of a distance between a lateral side of the cross bar and an outer edge of the central hole.

16. The rechargeable battery of claim 14,
wherein a cross sectional area of the first via hole is less than the sum of a cross sectional area of the lateral grooves and a cross sectional area of the central hole.

17. The rechargeable battery of claim 11,
wherein the central hole is filled with resin.

18. The rechargeable battery of claim 1,
wherein the cross bar further comprises a bending part formed by weakening the cross bar at the end portions of the cross bar.

19. The rechargeable battery of claim 18,
wherein each bending part comprises at least one lateral groove formed on at least one lateral side of the cross bar.

20. The rechargeable battery of claim 18,
wherein each bending part comprises at least one end groove formed substantially perpendicular to the cross bar on at least one of the upper surface and the lower surface of the cross bar.

21. The rechargeable battery of claim 18,
wherein the bending parts are stronger than the central breakage part so that the central breakage part will break and the bending parts will bend when the protrusion of the safety vent applies pressure to the cross bar.

22. The rechargeable battery of claim 18,
wherein the first via hole has a diameter such that an area of the cross bar around the first vial hole is stronger than the bending parts so that the bending parts will bend and the area of the cross bar around the first via hole will not break when the protrusion of the safety vent applies pressure to the cross bar.

23. The rechargeable battery of claim 1,
wherein the central breakage part comprises at least one central groove formed substantially perpendicular to the cross bar on at least one of the upper surface and the lower surface of the cross bar.

24. The rechargeable battery of claim 23,
wherein the central groove has a diameter that is at least about 25% of a thickness of the cross bar.

25. The rechargeable battery of claim 23,
wherein a cross sectional area of the first via hole is smaller than a cross sectional area of the central groove.

26. The rechargeable battery of claim 1,
wherein the first conductive layer comprises copper or a copper alloy.

27. The rechargeable battery of claim 26,
wherein the first conductive layer is at least about 5 μm thick.

28. The rechargeable battery of claim 26,
wherein the first conductive layer is formed using a plating process.

29. The rechargeable battery of claim 1,
wherein the first via hole is filled with resin.

30. The rechargeable battery of claim 1,
wherein the cross bar further comprises at least one second via hole arranged opposite the first via hole across the central breakage part, wherein a second conductive layer is arranged on an inner wall of second via hole and is electrically connected with the upper conductive thin film and the lower conductive thin film;

wherein the upper conductive thin film is arranged on an upper surface of a portion of the cross bar, the portion of the cross bar comprising at least an area from an end of the cross bar to the second via hole, and wherein the lower conductive thin film is arranged on a lower surface of a portion of the cross bar, the portion of the cross bar comprising at least an area from an end of the cross bar to the second via hole.

31. The rechargeable battery of claim 30,
wherein the second via hole has a shape that is substantially identical to a shape of the first via hole.

32. The rechargeable battery of claim 30,
wherein the second conductive layer comprises copper or a copper alloy.

33. The rechargeable battery of claim 30,
wherein the second via hole is filled with resin.

34. The rechargeable battery of claim 1,
wherein the upper conductive thin film and the lower conductive thin film comprise copper or a copper alloy.

35. The rechargeable battery of claim 1, further comprising:
an insulation layer formed on the upper conductive thin film and the lower conductive thin film.

36. The rechargeable battery of claim 35,
wherein the insulation layer comprises polyimide.

37. The rechargeable battery of claim 1, further comprising:
a secondary protective device coupled with an upper portion of the safety vent.

38. The rechargeable battery of claim 37,
wherein the secondary protective device comprises a positive temperature coefficient element.

39. The rechargeable battery of claim 1,
wherein the outer ring and the cross bar comprise an insulation printed board.

* * * * *